United States Patent [19]

Henderson et al.

[11] Patent Number: 4,844,614

[45] Date of Patent: Jul. 4, 1989

[54] INTERCHANGEABLE BEAM SPLITTING HOLDER AND COMPARTMENT THEREFOR

[75] Inventors: Jeff R. Henderson; Michael Jablonski; Gregory E. Adams, all of Madison, Wis.

[73] Assignee: Nicolet Instrument Corporation, Madison, Wis.

[21] Appl. No.: 92,090

[22] Filed: Sep. 1, 1987

[51] Int. Cl.[4] ................................................. G01B 9/02
[52] U.S. Cl. ...................................... 356/346; 350/321
[58] Field of Search ......................... 356/346; 350/321

[56] References Cited

U.S. PATENT DOCUMENTS

| 3,319,515 | 5/1967 | Flournoy . | |
|---|---|---|---|
| 3,936,193 | 2/1976 | Auth | 356/346 |
| 4,054,384 | 10/1977 | Hawes . | |
| 4,331,384 | 5/1982 | Gisler | 350/321 |
| 4,542,295 | 9/1985 | Mattson et al. . | |
| 4,544,272 | 10/1985 | Doyle . | |

OTHER PUBLICATIONS

*Optical Layouts and Specifications of Nicolet FT-IR Spectrometers,* Revised Mar. 1980, Nicolet Instrument Corp., Analytical Division, pp. 1-14.
*Nicolet 20DXB/20SXB Fourier Transform Infrared Spectrometer Series,* Nicolet Instrument Corp., 6 pages.

*Primary Examiner*—Vincent P. McGraw
*Assistant Examiner*—S. A. Turner
*Attorney, Agent, or Firm*—Lathrop & Clark

[57] ABSTRACT

An interchangeable beam splitter holder includes a retainer which holds the beam splitter, and a front door and rear door which are both hingedly connected to the retainer. The doors are movable between a closed position, in which the doors substantially cover the beam splitter, and an open position, in which the doors are pivoted upwardly so that the beam splitter is exposed. The beam splitter holder also has three adjusting screws with ends which are adapted to abut against pivot points in the interferometer to thereby align the beam splitter. The beam splitter holder also has three spring plungers which abut against surfaces within the interferometer to push the ends of the adjusting screws against the three pivot points in the interferometer. The beam splitter mounting assembly includes a portion of the interferometer which forms a cavity in which the beam splitter is mounted, and three adjustable pivot points against which the beam splitter holder is mounted to register the inserted beam splitter in its proper position. The beam splitter holder compartment protectively stores unused beam splitter holders and covers and protects the solt into the interferometer chamber where a beam splitter holder is placed for use. The compartment includes a base, and a lid which is hingedly connected to the base to close and seal the compartment.

27 Claims, 4 Drawing Sheets

INTERCHANGEABLE BEAM SPLITTING HOLDER AND COMPARTMENT THEREFOR

BACKGROUND OF THE INVENTION

1. Field of the Invention

The present invention relates generally to spectroscopy and, more particularly, to the mounting and protective storage of beam splitters which are utilized in a Fourier transform infrared spectrometer.

2. Description of the Prior Art

Fourier transform infrared (FT-IR) spectrometers are widely used in the analysis of chemical compounds. By measuring the absorption of infrared radiation by an unknown sample at various wavelengths in the infrared spectrum, and comparing the results with known standards, these instruments permit considerable useful information concerning the chemical makeup of the unknown sample to be obtained.

In a typical FT-IR spectrometer, infrared radiation from an infrared emitting source is collected and directed through a series of mirrors or other focusing elements to an interferometer which includes a beam splitter that splits the infrared radiation into two separate beams. The two separate beams are then directed to two mirrors which reflect the beams back to the beam splitter where the two beams are spatially recombined into a composite beam that exits the interferometer and is eventually transmitted through or reflected from the sample to be analyzed, and finally brought to focus on an infrared detector. The interferometer system, in combination with the sample, modulates the intensity of the infrared radiation that impinges on the detector, and thereby forms a time variant intensity signal. The output of the detector is digitized and processed in a computer in a conventional manner to yield the desired spectral information.

It is critical to the proper performance of these instruments that the beam splitter be mounted accurately in position within the interferometer so that the infrared radiation is properly split and recombined. Deviations in the position of the beam splitter can produce small errors in the time-domain interferogram which may translate into large errors in the frequency-domain spectrum. Additionally, the beam splitter used in an FT-IR instrument is the most delicate item in the instrument. It is desirable that the beam splitter be protected from handling by the user whenever the beam splitter is placed within or removed from the interferometer. If the user were to touch the beam splitter itself, the beam splitter could be ruined. The most common beam splitters are made of hygroscopic materials. It therefore is important to protect the beam splitter from both moisture and dust. Desiccant materials such as molecular sieve or silica gel may be used to afford additional protection from moisture. It also is desirable that beam splitters, which are not being used be stored in a safe, dry place.

SUMMARY OF THE INVENTION

In accordance with the present invention, an interchangeable beam splitter holder is constructed so that it can be easily inserted within a chamber in an interferometer to correctly position and mount the beam splitter within the interferometer. The holder includes a retainer which holds the beam splitter at its edges, and a front door and a rear door which both are hingedly connected to the retainer in a manner which allows the doors to move between a closed position, in which the doors substantially cover the front and rear of the retainer, and an open position in which the doors are moved upwardly so that the beam splitter is exposed. The front door and rear door are preferably biased to the closed position. The retainer includes a crown, a foot, a front, and a rear, and has a hole therethrough from the front to the rear which is sized to contain the beam splitter. The retainer has three adjusting screw holes which extend from the rear to the front of the retainer. Three adjusting screws with flat ends are placed within the three adjusting screw holes so that each adjusting screw is positionable within one of the holes to position selectively its flat end with respect to the retainer so that when the holder is placed within the interferometer chamber, the flat ends abut against the points of three pivot pins within the interferometer to determine a plane in which the beam splitter is centered. Furthermore, the holder includes three spring plungers which extend out from the front of the retainer near each of the adjusting screw holes, each spring plunger being adapted to press against a face within the interferometer when the holder is placed within the interferometer chamber to ensure that the flat end of the nearby adjusting screw is pressed against its corresponding pivot pin point on the interferometer.

The front door and the rear door each include a door top and a door bottom and are hingedly connected at the top to the retainer crown at the front and rear of the holder. Each door has an upper panel with a top and a bottom, the upper panel top being hingedly connected to the retainer crown, and a lower panel with a top and a bottom, the lower panel bottom being hingedly connected to the upper panel bottom so that the lower panel folds up and under the upper panel. The bottom of the lower panel remains adjacent to the retainer as the joint between the lower and upper panels pivots outwardly and upwardly away from the retainer when the door is opened. The upper and lower panels are substantially co-planar when the door is in its closed position.

Preferably, the holder also includes two slides, each slide being positioned adjacent to a retainer side. The slides are pivotally connected to the bottoms of both lower panels so that as the slides move up and down the retainer sides, the slides maintain both lower panel bottoms adjacent to the retainer as the lower panels fold up under the upper panels.

The three adjusting screws on the holder can be turned to accurately position the beam splitter so that the infrared radiation is properly split and recombined into a composite modulated beam. The spring plungers in the retainer may also be adjusted to assure that the flat ends of the adjusting screws are maintained against the three pivot points within the chamber when the beam splitter holder is placed into the chamber. Thus, the beam splitter holder of the present invention can be placed and maintained in accurate alignment within the interferometer chamber by making only a few simple adjustments. The folding doors on the holder are spring biased to close whenever the beam splitter holder is pulled out from the chamber to protect the beam splitter from being touched by the operator as he removes the holder. Additionally, the doors protect the beam splitter from dust or any other particles which may be in the atmosphere. A desiccant may be placed within the doors to protect the beam splitter from moisture.

The beam splitter mounting assembly enables an operator to place a beam splitter easily into its proper position within the chamber in the interferometer mounting block. The assembly includes a portion of the mounting block which forms a front wall, a rear wall, and a base which together define the chamber for receiving the beam splitter, three pivot point pins which are adjustably mounted within the block to the rear wall, and the beam splitter holder. The chamber within the interferometer extends upwardly from the base to a slot formed in an exterior surface of the block. Each pivot point pin is selectively positionable in a direction perpendicular to the rear wall so that the three points of the pivot pins collectively define a first plane. The three adjusting screws in the holder have flat ends which are adapted to abut against the three points of the point pins when the holder is placed into the chamber. The position of these three flat ends determine a second plane in which the beam splitter is centered.

The slot through the exterior surface of the block preferably is rectangular and is sized to receive the retainer foot-first but too short to receive the slides, so that as the retainer is pushed into the chamber through the slot, the slides rest on a surface adjacent the slot and move up the retainer sides, opening the doors. The doors on the holder are spring-biased to their closed positions so that as the retainer is removed from the chamber, the slides move down the retainer sides so that the doors close to protect the beam splitter while it is outside the chamber.

The beam splitter mounting assembly has three adjustable pointed pivot pins against which the beam splitter holder is mounted. At the factory, these pivot pins may be quickly and accurately adjusted to accurately set the position of the first plane. The guide and plate which are mounted to the front wall of the chamber are located and shaped so that as the holder is placed into the chamber, the spring plungers are retracted to bias the retainer against the three pivot pins points on the rear wall. The folded doors on the holder do not interfere with the placement of the holder within the chamber, but instead remain outside of the chamber in a dish which is connected to the exterior surface of the mounting block around the slot. In this folded position, the doors afford additional protection to the slot in which the holder is placed.

The cabinet of the spectrometer also preferably includes a beam splitter holder compartment which stores unused beam splitters within their holders and covers and protects the slot into the interferometer chamber where a single beam splitter with its holder is placed for use. The compartment includes a base which extends over the beam splitter mounting block and a lid which, when closed, hermetically seals the compartment to inhibit the entry of moisture from the ambient atmosphere. The base has at least one depression conforming approximately to a face of a closed beam splitter holder so that the holder may be seated at least partially within the depression for storage. The beam splitter holder compartment thus provides a safe, clean, and dry storage place for unused beam splitters, and protects and covers the slot into which beam splitter holders are inserted for use. The compartment is easily opened to allow an operator access to the beam splitter holders which are stored therein, and to the beam splitter holder which has been inserted into the interferometer chamber. A desiccant may be placed into the compartment to prevent moisture from damaging the beam splitters by drying both the region in which a beam splitter is held in normal use position in the spectometer and any beam splitters in storage in the enclosed compartment.

Further objects, features and advantages of the invention will be apparent from the following detailed description when taken in conjunction with the accompanying drawings.

DESCRIPTION OF THE PREFERRED EMBODIMENT

Figure 1:
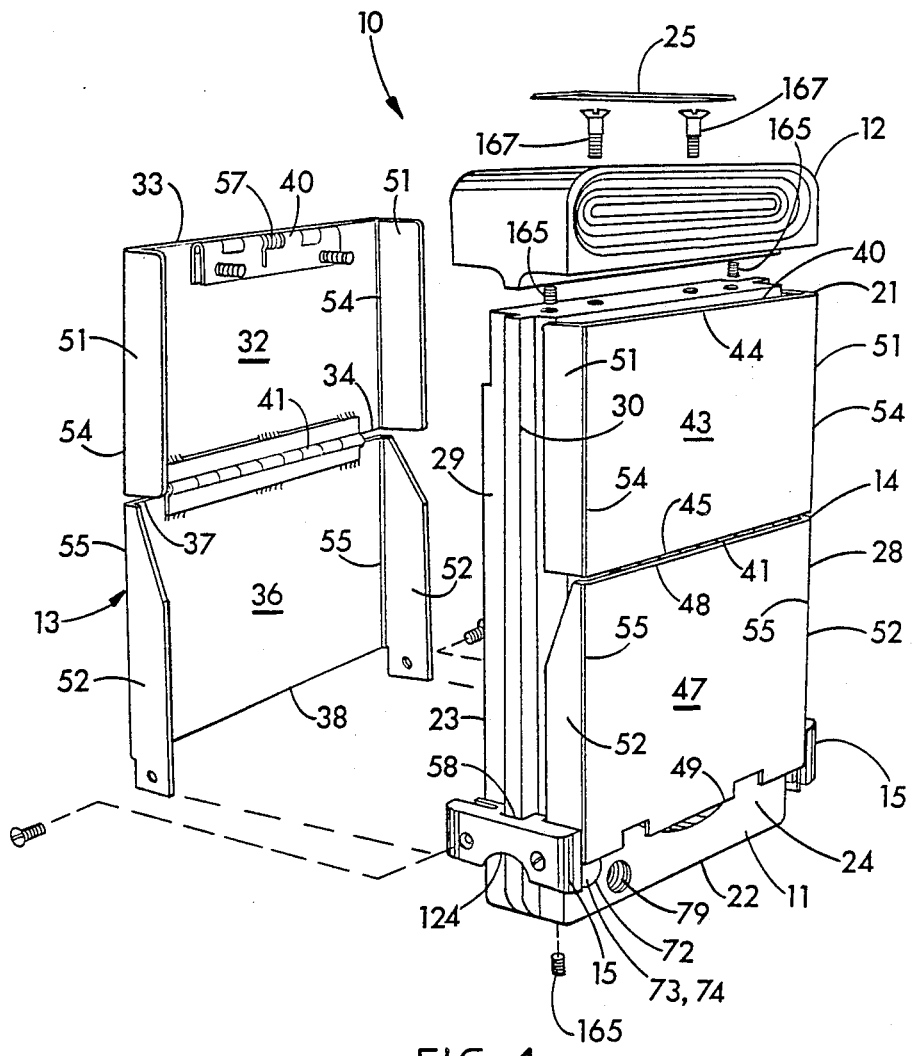
FIG. 1 is a perspective view of a beam splitter holder with the handle and front door shown spaced away from the holder for illustrative purposes.
Figure 2:
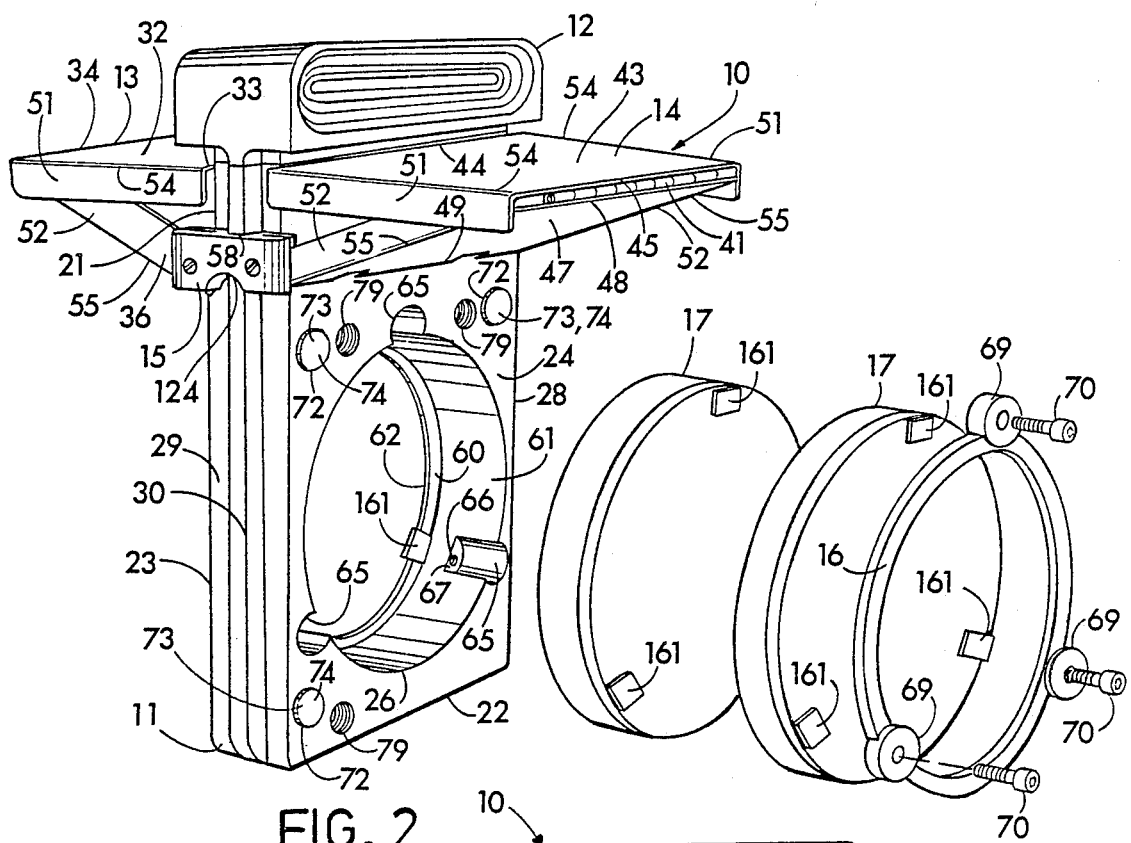
FIG. 2 is a perspective view of the beam splitter holder of FIG. 1 showing the doors in their open position, and with the beam splitter and ring shown spaced away from the beam splitter holder.
Figure 3:
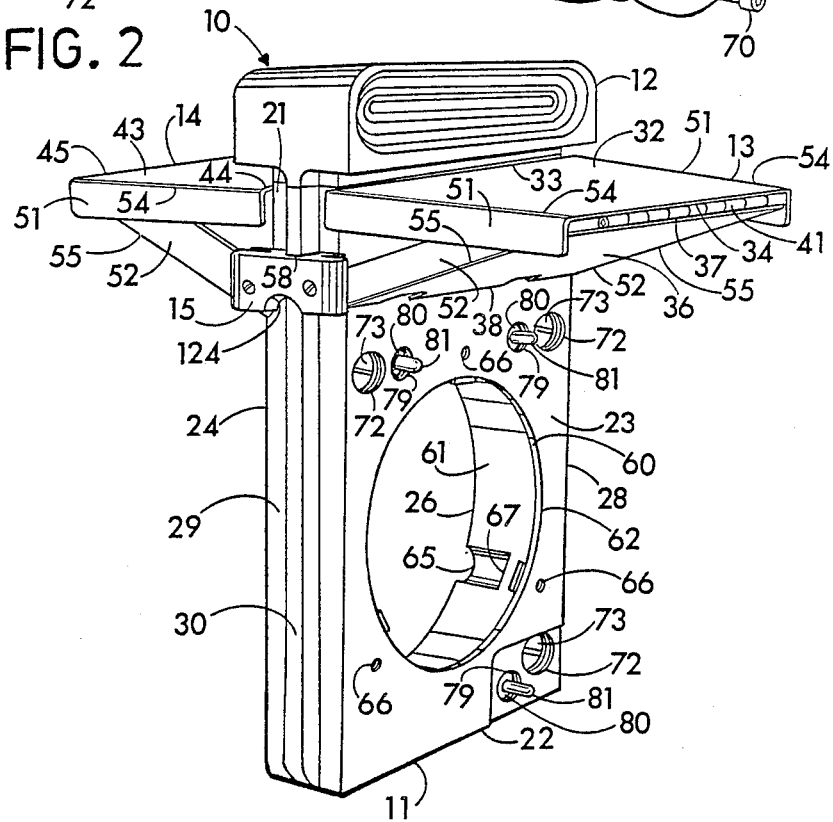
FIG. 3 is a perspective view of the beam splitter holder of FIG. 1 with the doors in their open position, showing the front of the retainer.

With reference to the drawings, the interchangeable beam splitter holder of the present invention is shown generally at 10 in FIGS. 1-3. The holder is adapted to hold a beam splitter 17 and to be used to insert and position that beam splitter 17 through a slot 99 into a chamber 76 within an interferometer 78. As shown in FIGS. 1-3, the preferred holder 10 generally includes a retainer 11, a handle 12, a front door 13 and a rear door 14 which both are pivotally connected to the retainer 11, two slides 15, and a ring 16 for retaining the beam splitter 17 within the retainer 11. The retainer 11 includes a crown 21, a foot 22, a front 23, and a rear 24, and has a hole 26 extending therethrough from the front 23 to the rear 24. The hole 26 is sized to contain and hold the beam splitter 17. Additionally, the preferred retainer 11 has a left side 28 and a right side 29 which each include a vertical rail 30 which extends substantially the entire length of the side 28 or 29. The handle 12 is attached to the retainer crown 22 by flathead screws 167. Preferably a label 25 is adhesively applied to the handle 12 over the flathead screws 167, as illustrated in FIG. 1.

The front door 13 includes an upper panel 32 having a top 33 and a bottom 34, and a lower panel 36 having a top 37 and bottom 38. The top 33 of the upper panel 32 is pivotally connected to the retainer crown 21 by an upper hinge 40, and the lower panel 36 at its top 37 is pivotally connected to the bottom 34 of the upper panel 32 by a lower hinge 41 that is shown most clearly in FIGS. 1 and 3. Thus, the top of the front door 13 is defined by the top 33 of the upper panel 32, and the bottom of the front door 13 is defined by the bottom 38 of the lower panel 36. Likewise, the rear door 14 includes an upper panel 43 having a top 44 and bottom 45, and a lower panel 47 having a top 48 and a bottom 49.

The upper panel 43 at its top 44 is pivotally connected to the retainer crown 21 by an upper hinge 40, and the lower panel 47 at its top 48 is pivotally connected by a lower hinge 41 to the bottom 45 of the upper panel 43. Therefore, a bottom of the rear door 14 is defined by the bottom 49 of the lower panel 47, and the top of the rear door 14 is defined by the top 44 of the upper panel 43. Each of the doors 13 and 14 preferably includes flanges 51 and 52 which extend inwardly from the sides 54 and, respectively, 55 of the panels 32, 36, 43, and 47. Each lower panel 36 and 47 at its bottom 38 and 49, respectively, is pivotally connected to both of the slides 15.

FIG. 1 shows the doors 13 and 14 in their closed position, although the front door 13 is shown spaced away from the retainer 11. The doors 13 and 14 are movable between a closed position, in which the front door 13 substantially covers the retainer front 23 and the rear door 14 substantially covers the retainer rear 24 so that both doors 13 and 14 cover and protect the beam splitter 17, and an open position in which the doors 13 and 14 are pivoted and folded upwardly so that the beam splitter 17 is exposed. When the doors 13 and 14 are in their closed position, the flanges 51 and 52 on the doors 13 and 14 partially overlap the retainer sides 28 and 29. The doors 13 and 14 are both spring biased to their closed position wherein the upper and lower panel of each door are substantially aligned in co-planer relationship. A spring 57 biases the front door 13 to its closed position, as best shown in FIG. 1.

The lower panel bottoms 38 and 49 are maintained adjacent to the retainer 11 by the slides 15. Each slide 15 has a groove 58 by which it is seated on one rail 30 so that it can move up and down the side 28 or 29 of the retainer 11. As the doors 13 and 14 move to their open position, the lower panels 36 and 47 fold up under the attached upper panels 32 and 43 so that the lower panel bottoms 38 and 49 remain adjacent to the retainer 11 as the upper panels 32 and 43 pivot outwardly and upwardly away from the retainer 11. The slides 15 also maintain the lower panel bottoms 38 and 49 adjacent to the retainer 11 as the upper panels 32 and 43 and lower panels 36 47 unfold to cover and protect the beam splitter 17.

The retainer 11 includes a circular flange 60 which is formed by an inside surface 61 of the hole 26 at the front 62 of the hole 26 to maintain the beam splitter 17 within the hole 26. The holder 10 further includes a ring 16 which is adapted to fit within the hole 26 adjacent to the inside surface 61 thereof and adjacent to the beam splitter 17 to maintain the beam splitter 17 within the hole 26. The holder 10 further includes means for retaining the ring 16 within the hole 26. Preferably the ring retaining means includes surfaces on the retainer 11 which form a plurality of bores 65 which each join and open into the hole and extend only partially through the retainer 11 from the rear 24 thereof to the ends 67 of the bores, and three screw holes 66 which each extend axially with respect to the bores 65 from one of the bore ends 67 into the retainer 11 as is best shown in FIG. 2. The ring retaining means also preferably includes three washer stops 69 which are adapted to fit into the bores 65 while simultaneously extending partly into the hole 26 to overlie and maintain the ring 16 in the hole 26, and three screws 70 which each are adapted to screw through a washer stop 69 into a screw hole 66 to maintain the washer stop 69 within the bore 65 and overlying the ring 16, as shown in FIGS. 2 and 4.

The retainer 11 has three adjusting screw holes 72 which extend therethrough from the rear surface 24 to the front surface 23. The holder 10 further includes three adjusting screws 73 with flat ends 74. Each adjusting screw 73 is positionable within one of the adjusting screw holes 72 to selectively position its flat end 74 with respect to the retainer rear 24 so that when the retainer 11 is placed within an interferometer chamber 76, the flat ends 74 of the adjusting screws 73 abut against the points of three pivot pins 77 within the interferometer 78 to determine the plane in which the beam splitter 17 is centered as shown in FIG. 4.

The retainer 11 also has three plunger screw holes 79 which extend therethrough from the front 23 to the rear 24 of the retainer 11. Each plunger screw hole 79 is located nearby one of the adjusting screw holes 72 as shown in FIG. 3. The holder 10 further includes three plunger screws 80 which each have a spring plunger 81. Each of the plunger screws 80 is located within one of the plunger screw holes 79 so that the spring plungers 81 extend out from the front 23 of the retainer 11. Each plunger screw 80 is rotatably positionable within its plunger screw hole 79 so that the extent to which each spring plunger 81 extends out from the front 23 of the retainer 11 is adjustable. Each spring plunger 81 is adapted to abut and press against a face formed by a guide 107 or plate 111 within the interferometer 78 when the retainer 11 is placed within the interferometer chamber 76 so that the flat end 74 of the nearby adjusting screw 73 is pressed against its corresponding pivot point 77 on the interferometer 78, as best shown in FIG. 4.

Figure 4:
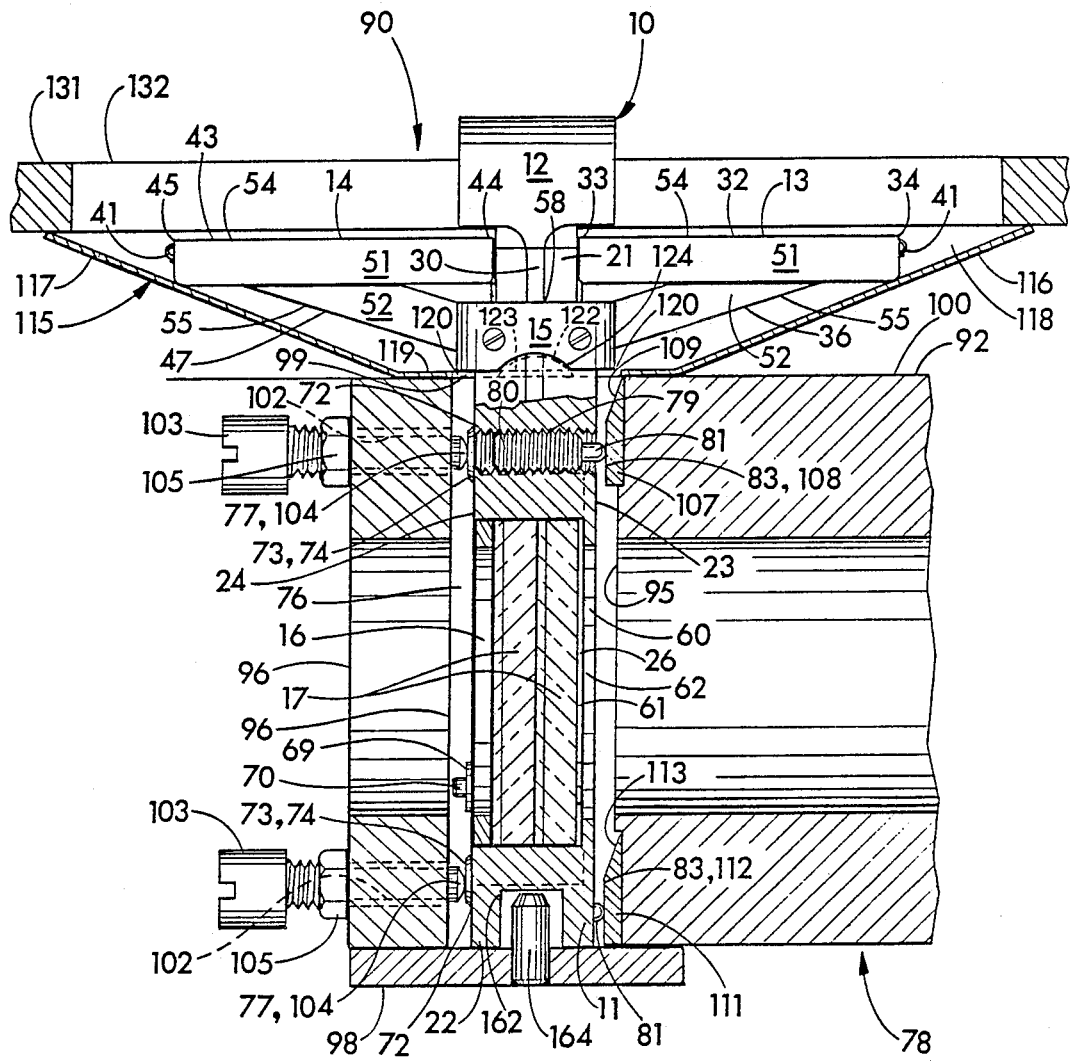
FIG. 4 is a section view of a beam splitter mounting assembly in accordance with the present invention, showing the beam splitter holder inserted into its mounting chamber within an interferometer mounting block.
Figure 5:
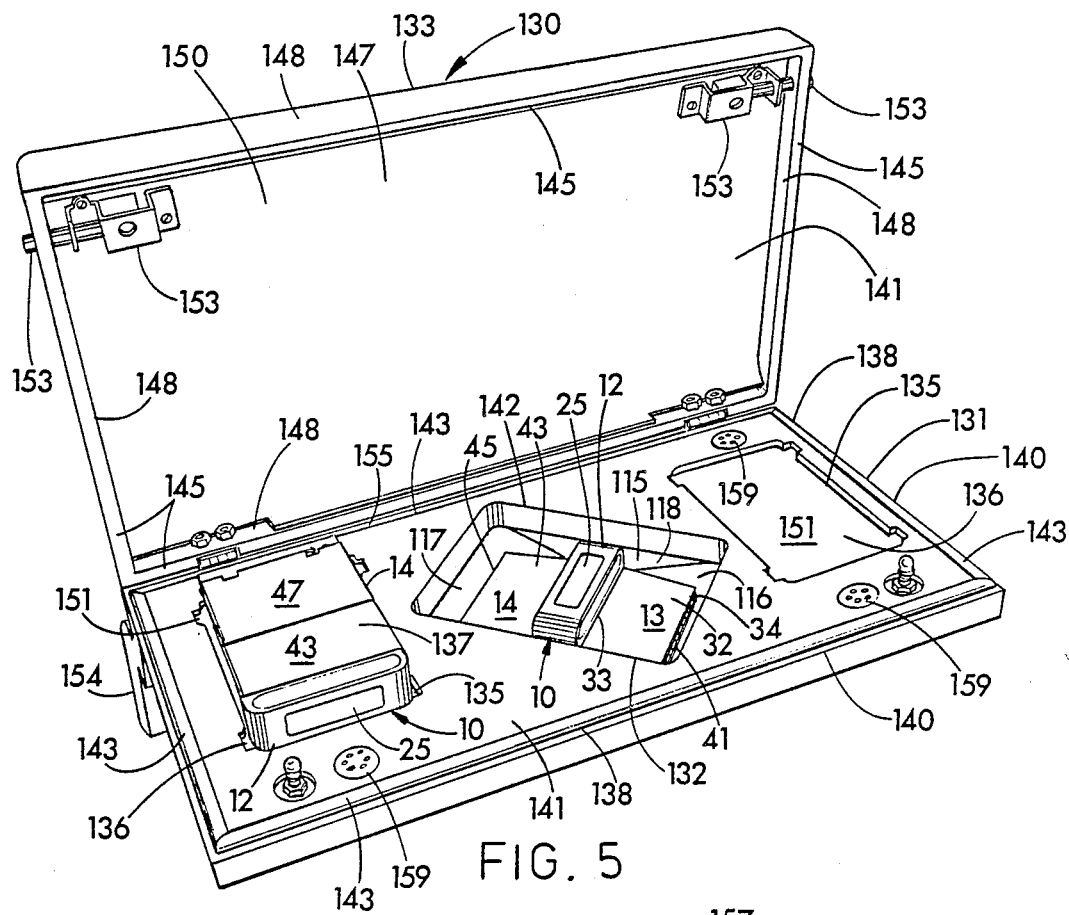
FIG. 5 is a perspective view of a beam splitter holder compartment in accordance with the present invention, with the lid shown in its open position.

A beam splitter mounting assembly in accordance with the present invention is shown generally at 90 in FIG. 4. The beam splitter mounting assembly 90 enables an operator to place a beam splitter 17 into proper position within the chamber 76 in an interferometer mounting block 92 as shown in FIGS. 4 and 5. The assembly 90 includes a portion of the mounting block 92 which forms the chamber 76, three adjustable pivot points 77, and the beam splitter holder 10 described above. The chamber 76 which receives the beam splitter 17 is formed by interior wall structures in the mounting block including a front wall 95, a rear wall 96, and a base 98. The chamber 76 extends from the base 98 to a slot 99 through the exterior surface 100 of the block 92. The beam splitter holder 10 is inserted into the chamber 76 through the slot 99.

The assembly 90 includes three pivot screws 103, each having a hemispherical end 104, which form the pivot point pins 77. The pivot screws 103 are located in three pivot screw holes 102 which extend through the rear wall 96. Thus the three adjustable pivot point pins 77 are adjustably mounted within the block 92 to the rear wall 96. Each pivot point pin 77 is selectively positionable in a direction perpendicular to the rear wall 96 so that the three points of the pivot pins 77 collectively define a first plane against which the holder 10 will rest. FIG. 4 is a rightward-looking section view of the assembly 90 with the section line extending vertically through the plunger screw hole 79 and plunger screw 80 near the left side 28 of the beam splitter holder 10. Since the adjusting screw 73 to the left side 28 of the holder 10 and its corresponding pivot screw 103 on the assembly 90 are to the left of the plunger screw hole 79 shown in section, they are not shown in this view. Instead, FIG. 4 shows only two pivot screw holes 102, two pivot screws 103, and the two flat ends 74 of the abutting adjusting screws 73. Each pivot screw 103 is selectively positionable within one of the pivot screw holes 102 to selectively position the point of the pivot pin 77. Three lock nuts 105 are located on the pivot screws 103 outside the rear wall 96. Each of the lock nuts 105 turns to abut against the rear wall 96 to thereby lock its corresponding pivot screw 103 in place within the pivot screw hole 102. The three flat ends 74 of the adjusting screw 73 abut against the three pivot point pins 77 when the holder 10 is properly located in the chamber 76 to determine a second plane in which the beam splitter 17 is centered.

The assembly 90 further includes a guide 107 which is mounted to the front wall 95 of the chamber 76 along and adjacent to the slot 99. The guide 107 includes a first face 108 against which two of the spring plungers 81 abut to press when the retainer 11 is placed into the chamber 76. FIG. 4 shows one spring plunger 81 abutting against the first face 108 of the guide 107. The other upper spring plunger 81 which abuts against the first face 108 is obscured behind the spring plunger 81 shown. The guide 107 also includes a first beveled surface 109 which is formed adjacent to the first face 108 so that as the retainer 11 is pushed down into the chamber 76, the spring plungers 81 slide down the first beveled surface 109, thereby being gradually pressed rearwardly until the spring plungers 81 rest on the first face 108. The spring plungers 81 are thus compressed and thereby force the flat ends 74 of the adjusting screw 73 against the points of the pivot pins 77. Additionally, the assembly 90 includes a plate 111 which is mounted to the front wall 95 of the chamber 76 along and adjacent to the base 98 of the chamber 76. This plate 111 includes a second face 112 against which one of the spring plungers 81 abuts and presses when the retainer 11 is placed within the chamber 76. The plate 111 also includes a second beveled surface 113 which is formed adjacent to the second face 112 so that, as the retainer 11 is pushed down into the chamber 76, the spring plunger 81 slides down the second beveled surface 113 and is gradually pressed rearwardly so that the spring plunger 81 is compressed when it rests against the second face 112 of the plate 111. The compression of the spring plunger 81 forces the flat end 74 of the adjacent adjusting screw 73 against the corresponding pivot point pin 77.

The assembly 90 further includes a dish 115 which is mounted to the exterior surface 100 around the slot 99. The dish 115 includes a forward wall 116, which projects upwardly and forwardly at an incline from the exterior surface 100, and a back wall 117 which projects upwardly and rearwardly at an incline from the exterior surface 100. The forward wall 116 and the back wall 117 are parallel to a long axis of the slot 99, the long axis of the slot 99 extending perpendicularly outwardly from the page of FIG. 4. The dish 115 further includes two side walls 118 which are parallel to a short axis of the slot 99 and are joined to the forward wall 116 and rearward wall 117, and to the exterior surface 100. Preferably, the dish 115 includes a bottom wall 119 by which the forward, back, and side walls 116, 117, and 118 are connected to the exterior surface 100 of the block 92. The bottom wall 119 of the dish 115 has a contiguous slot 120 which is continuous with and conforms approximately in shape to the slot 99 in the exterior surface 100 of the mounting block 92. When the retainer 11 is inserted into the chamber 76, the holder doors 13 and 14 fold open. The assembly 90 preferably includes two catches 122 which extend upwardly from a surface 123 on the bottom wall 119 adjacent to the slot 76 where the slides 15 come to rest when the retainer 11 is being inserted into the chamber 76. The slides 15 each have a downward facing notch 124 which conforms to the shape of a catch 122 so that the notches 124 register with the catches 122 when the retainer 11 is being inserted into the interferometer chamber 76. Notches 124 register with the catches 122 to help position the holder 10 while the retainer 11 is being inserted into the chamber 76 and to provide support for the doors after insertion so that vibrations from the doors are not transmitted to the beam splitter. The slot 99 is rectangular and is sized to receive the retainer 11 foot first, but is too short to receive the slides 15, so that as the retainer 11 is pushed into the chamber 76 through the slot 99, the slides 15 resting on the surface 123 register with the catches 122 adjacent the slot 99 and move up the retainer sides 28 and 29, thereby opening the doors 13 and 14. It therefore is preferred that the dimension of the slot 99 along its long axis be slightly longer than the distance between the two rails 30 on the retainer 11, so that the rails 30 will clear the slot 99, but not the slides 15.

Figure 6:
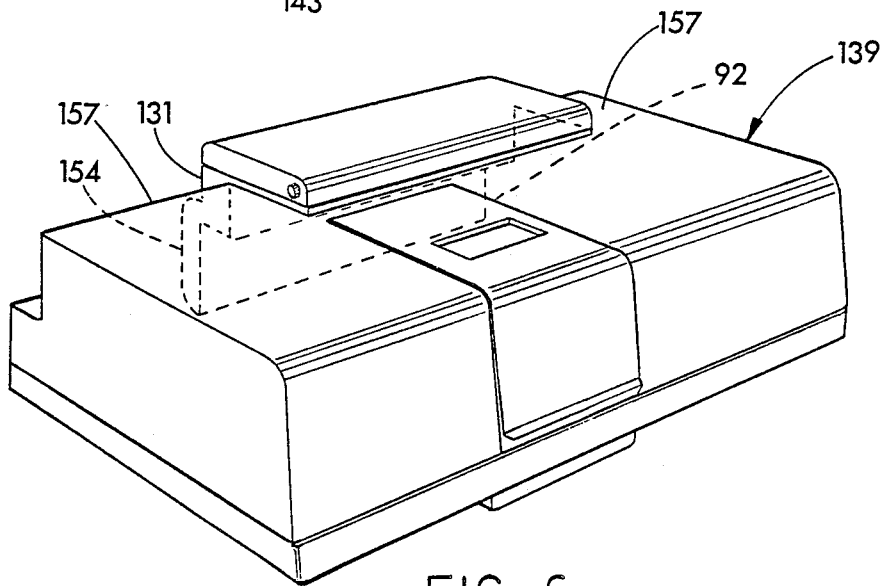
FIG. 6 shows the beam splitter holder compartment of FIG. 5 mounted to a spectrometer.

A beam splitter holder compartment in accordance with the present invention is shown generally in FIGS. 5 and 6 at 130. The holder compartment 130 is used for protectively storing unused beam splitters 17 within their respective beam splitter holders 10 and for covering and protecting the slot 99 into the interferometer chamber 76 into which a single beam splitter 17 with its retainer 11 is placed for use. The compartment 130 includes a base 131 having an opening 132 through which a beam splitter holder 10 with beam splitter 17 is inserted within the slot 99 into the chamber 76, and a lid 133 which is connected hingedly to the base 131 to be movable between an open position, and a closed position in which the lid 133 covers the base 131 as shown in FIG. 5. The base 131 has two depressions 135 which each have a bottom 136 which conforms approximately to a face 137 of a beam splitter holder 10, so that a holder 10 may be seated at least partially within the depression 135 for storage. The base 131 furthermore has a circumambiant groove 138 which is formed near a periphery 140 of the base 131. The circumambiant groove 138 circumscribes an interior chamber 141 of the compartment 130. The base 131 is mounted to the spectrometer 139 shown in FIG. 6 over the block 92 so that the opening 132 is centered over the slot 99 in the block 92. The opening 132 should be defined by a margin 142 which is adapted to overlie the dish 115 that is mounted to the exterior surface 100 of the mounting block 92 around the slot 99. Thus an operator has full access to the entire dish 115, and furthermore the front and rear doors 13 and 14 of the beam splitter holder 10 are able to fold outwardly into the dish 115 as the retainer 11 is inserted into the chamber 76 within the interferometer mounting block 92, as shown in FIG. 5.

The compartment 130 furthermore includes an elastic gasket 143 which is seated in the groove 138 and which extends slightly upwardly beyond the groove 138. The lid 133 includes a peripheral surface 145 which rests on the elastic gasket 143 when the lid 133 is in its closed position to thereby prevent moisture from entering the compartment interior 141 between the base 131 and lid 133. The base 131 has four vents 159 which extend therethrough to allow dry purge air to pass between the interferometer 78 and the compartment interior 141.

The lid 133 includes a roof 147 and side walls 148 extending therefrom which are joined together to define the interior 141 of the compartment 130. The side walls 148 descend from the roof 147 to terminate at the peripheral surface 145. The compartment 130 further includes a cushion 150 which is placed against the roof 147 within the compartment interior 141 between the sidewalls 148 to overlie and protect the beam splitter holders 10 when the lid 133 is closed. Additionally, the compartment includes two pads 151 which each lie within one of the two depressions 135 on the bottom 136 thereof to cushion and protect the holder 10 seated within the depression 135. Preferably the compartment 130 includes two latches 153 which hold the lid 133 in its closed position over the base 131 until the latches 153 are released. As shown in FIG. 5 and in dashed lines in FIG. 6, the compartment includes an integral support member 154 which descends from the rear side 155 of the base 131 to abut against the exterior 157 of the spectrometer 139 to position and brace the compartment 130 on the spectrometer 139.

The interchangeable beam splitter holder 10, the beam splitter mounting assembly 90, and the beam splitter holder compartment 130 shown are particularly adapted to be used in conjunction with one another. The interchangeable beam splitter holder 10 is adapted to be placed through the slot 99 into the interferometer chamber 76 within the mounting block 92. To place a beam splitter 17 within the holder 10, the doors 13 and 14 are simply folded upwardly and the ring 16 removed by removing the screws 70 and washer stops 69. The beam splitter 17 is then placed carefully within the hole 26. The pads 161 should be placed between the circular flange 60 and the beam splitter 17, between the two parts of the beam splitter 17, and also between the beam splitter 17 and the ring 16 to protect the beam splitter 17. The ring 16 is pressed over the beam splitter 17 using the screws 70 and washer stops 69.

The adjusting screws 73 and plunger screws 80 on the holder 10 can be adjusted depending upon how the retainer 11 sits within the interferometer chamber 76. The flat ends 74 of the adjusting screws 73 should pass against the hemispherical ends 104 of the pivot screws 103, and the spring plungers 81 against the guide 107 and plate 111. Normally the pivot screws 103 are adjusted and locked down using the lock nuts 105 at the time of manufacture.

To insert a beam splitter holder 10 into the interferometer 78, the operator first opens the lid 133 by pushing the latches 153 and raising the lid 133. A beam splitter holder 10 may then be taken from its depression 135 by its handle 12 and placed over the contiguous slot 120 so that it is aligned therewith within the opening 132 in the base 131. The retainer 11 is then pushed down into the chamber 76 foot-first so that the slides 15 are registered on the catches 122 in the dish 115. As the retainer 11 is pushed down into the chamber 76, the slides 15 move up the rails 30 on the sides 28 and 29 of the retainer 11 so that the doors 13 and 14 are folded outwardly into the dish 115 to expose the beam splitter 17 within the chamber 76. As the retainer 11 drops into the chamber 76, the flat ends 74 of the adjusting screws 73 begin to abut against the hemispherical ends 104 of the pivot screws 103, and the spring plungers 81 are compressed as they move over the first and second beveled surfaces 109 and 113 on the guide 107 and plate 111. Once the retainer 11 is seated properly within the chamber 76, the spring plungers 81 are compressed so that the flat ends 74 are pressed against the points of the hemispherical ends 104 of the pivot pin screws 103, as shown in FIG. 4. Additionally, the foot 22 of the retainer 11 has an alignment aperture 162 into which an alignment pin 164 extends from the base 98 of the chamber 76. The alignment aperture 162 and alignment pin 164 also help to align the retainer 11 within the chamber 76. When the retainer 11 is not seated on the alignment pins 164, the laser beam within the inferometer is automatically shut off.

If the retainer 11 is not aligned correctly within the chamber 76, the retainer 11 should be removed from the chamber 76 and the adjusting screws 73 adjusted so that the beam splitter 17 is centered in the correct plane and location. The adjusting screws 73 should be positioned so that the infrared radiation is properly split and recombined into a composite interfering beam. The three set screws 165 shown in FIG. 1 may be inserted and tightened to lock the position of the adjusting screws 73. Of course to gain access to the set screws 165 in the crown 21, the handle 12 must be removed by loosening the flathead screws 167.

If the operator desires to place a different beam splitter 17 within the chamber 76, the operator first removes the holder 10 which is already inserted into the interferometer 78 by grasping its handle 12 and pulling upwardly. As the retainer 11 exits the chamber 76 through the slot 99, the slides 15 move down the rails 30 on the sides 28 and 29 of the retainer 11, thereby allowing the doors 13 and 14 to close protectively over the beam splitter 17. The removed beam splitter holder 10 may then be placed into an empty depression 135. Another interchangeable beam splitter holder 10 may then be grasped by its handle 12 and placed into the interferometer 78 as described above. When using the interchangeable beam splitter holders 10, the operator should be careful not to accidently open the doors 13 and 14 and touch the beam splitter 17, thereby ruining the beam splitter 17. Once the beam splitter holder 10 and beam splitter 17 are inserted into the interferometer 78 as shown in FIGS. 4 and 5, the lid 133 of the beam splitter holder compartment 130 should be closed and latched shut as shown in FIG. 6. A desiccant may be used to help keep the air dry within the interior 141 of the compartment 130. The vents 159 allow dry purge air to circulate between the interferometer 78 and the compartment interior 141 so that both remain dry.

Using the adjusting screws 73 in the holder 10, the position of the retainer 11 within the chamber 76 can be adjusted easily so that the infrared radiation is properly split and recombined into a composite beam. The doors 13 and 14 are biased to close as the beam splitter holder 10 is pulled from the interferometer chamber 76. The beam splitter 17 is thereby protected from being touched and ruined by the operator who removes the holder 10. The doors 13 and 14 also protect the beam splitter 17 from dust or any other particles which could be in the atmosphere. A desiccant may also be placed within the doors 13 and 14 to give the beam splitter 17 additional protection from moisture.

The guide 107 and plate 111 are located and shaped within the chamber 76 so that as the holder 10 is placed into the chamber 76, the spring plungers 81 are retracted to bias the retainer 11 against the three hemispherical ends 104 of the pivot screws 103. When the retainer 11 is properly positioned within the chamber 76, the doors 13 and 14 are folded up into their open position so as not to interfere with the placement of the holder within the chamber 76.

The beam splitter holder compartment 130 provides a safe, clean, and dry storage place for unused beam splitters 17, and covers and protects the slot 99 into which beam splitter holders 10 are inserted for use within the interferometer 78. The compartment 130 also provides for easy access to the inserted beam splitter holder 10 and the unused beam splitter holders 10 within the compartment 130. A desiccant may be placed within the compartment 130 to prevent moisture from damaging the beam splitters 170 contained therein.

It is understood that the present invention is not limited to the particular embodiment disclosed herein, but embraces all such modified forms thereof as come within the scope of the following claims.

What is claimed is:

1. A beam splitter holder for protectively holding a beam splitter, the holder being adapted to be placed through a slot into a chamber in an interferometer to correctly position and mount the beam splitter within the interferometer, the holder comprising:
   (a) a retainer which includes a crown, a foot, a front surface, and a rear surface, and which has a hole formed therethrough from the front surface to the rear surface, the hole being sized to contain and hold the beam splitter;
   (b) a front door and a rear door, each door including a door top and a door bottom, the front door being hingedly connected at the top to the retainer crown at the front of the holder and the rear door being hingedly connected at the top to the retainer crown at the rear of the holder, the doors being movable between a closed position in which the front door substantially covers the retainer front surface and the rear door substantially covers the retainer rear surface so that both doors cover and protect the beam splitter, and an open position, in which the doors are pivoted upwardly so that the beam splitter is exposed.

2. The holder of claim 1 wherein each door includes and is formed by an upper panel having a top and a bottom, the upper panel top being the door top which is hingedly connected to the retainer crown; and a lower panel including a top and a bottom, the lower panel bottom being the door bottom and the lower panel top being hingedly connected to the upper panel bottom to enable the lower panel to fold up and under the upper panel so that the lower panel bottom remains adjacent to the retainer as the upper panel pivots outwardly and upwardly away from the retainer as the door opens, the upper and lower panel being susbstantially aligned when the door is in its closed position.

3. The holder of claim 2 further including two sides with each side including a rail which extends from the foot to the crown of the holder, and two slides which each have a groove, each slide by its groove seating on and being movable up and down one rail, each lower panel at the bottom thereof being pivotally connected to each slide so that as the two slides move up and down the rails, the slides maintain both lower panel bottoms in adjacent relation to the retainer both as the lower panels fold up under the upper panels, and as the upper and lower panels unfold to cover the beam splitter.

4. The holder of claim 1 wherein an inside surface of the hole forms a flange at a front of the hole to maintain the beam splitter within the hole; and wherein the holder further includes a ring which is adapted to fit within the hole adjacent to the inside surface thereof and adjacent to the beam splitter to maintain the beam splitter within the hole, the holder further including means for retaining the ring within the hole.

5. The holder of claim 4 wherein the means for retaining the ring within the hole includes:
   (a) surfaces in the retainer which form:
      (1) a plurality of bores which each join and open into the hole, the bores extending partially through the retainer from the rear thereof to the ends of the bores; and
      (2) a plurality of screwholes which each extend axially with respect to the bores from one of the bore ends into the retainer;
   (b) washer stops which are adapted to fit into the bores while simultaneously extending partly into the hole to overlie and maintain the ring in the hole; and
   (c) screws which are adapted to screw through the washer stops into the screwholes to maintain the washer stops within the bores and overlying the ring.

6. The holder of claim 1 which further includes three adjusting screws with flat ends and which further has three adjusting screwholes which extend from the rear to the front of the retainer, each adjusting screw being positionable within one of the adjusting screwholes to selectively position its flat end with respect to the retainer rear so that when the holder is placed within the interferometer chamber the flat ends abut against three pivot points within the interferometer to determine a plane in which the beam splitter is centered.

7. The holder of claim 6 which further includes three spring plungers which extend out from the front of the retainer near each of the adjusting screwholes, each spring plunger being adapted to abut and press against a face within the interferometer when the holder is placed within the interferometer chamber so that the flat end of the nearby adjusting screw is pressed against its corresponding pivot point on the interferometer.

8. The holder of claim 7 wherein the retainer has three plunger screwholes which extend therethrough from the front to the rear of the retainer, each plunger screwhole being nearby one of the adjusting screwholes; and
   wherein the holder includes three plunger screws, each plunger screw including one of said spring plungers and being located within one of the plunger screwholes, each plunger screw being positionable within the plunger screwhole so that the extent to which each spring plunger extends out from the front of the retainer is adjustable.

9. The holder of claim 2 wherein the upper panels and lower panels include flanges which extend inwardly from sides of the panels, so that each flange partially overlaps one of the retainer sides when the doors are in their closed position.

10. The holder of claim 1 including means for spring biasing the doors to their closed positions.

11. The holder of claim 1 further including a handle which is removably connected to the retainer crown.

12. A beam splitter mounting assembly which enables an operator to place a beam splitter into a proper position within the interferometer, the assembly comprising:

(a) a mounting block having portions which form a front wall, a rear wall, and a base which together define a chamber for receiving the beam splitter, the chamber extending from the base to a slot in an exterior surface of the block;

(b) three adjustable pivot points which are adjustably mounted within the block to the rear wall, each pivot point being selectively positionable in a direction perpendicular to the rear wall so that the three pivot points collectively define a first plane;

(c) a beam splitter holder for protectively holding a beam splitter, the holder being adapted to be placed within the chamber to position and mount the beam splitter correctly in the chamber, the holder including:

(1) a retainer which includes a crown, two sides, a foot, a front surface, and a rear surface, and which has a hole therethrough from the front surface to the rear surface, the hole being sized to contain and hold a beam splitter, the retainer further having three adjusting screwholes which extend from the rear to the front of the retainer;

(2) three adjusting screws with ends, each adjusting screw being positionable within one of the adjusting screwholes to selectively position its end in a direction perpendicular to the retainer rear, the three ends being adapted to abut against the three pivot points when the holder is placed in the chamber to determine a second plane in which the beam splitter is centered;

(3) a front door and a rear door, each door including and being formed by an upper panel with a top and a bottom, the upper panel top being hingedly connected to the retainer crown to allow the upper panel to pivot outwardly and upwardly away from the retainer; and a lower panel with a top and a bottom, the lower panel top being hingedly connected to the upper panel bottom to enable the lower panel to fold up and under the upper panel as the upper panel pivots outwardly and upwardly when the door opens; wherein the doors are movable between a closed position in which the front door with its panels aligned substantially covers the retainer front and the rear door with its panels aligned substantially covers the retainer rear so that both doors cover and protect the beam splitter, and an open position in which the doors are pivoted upwardly with the upper and lower panels folded together to expose the beam splitter; and (4) two slides, each slide being positioned adjacent to a retainer side and being pivotally connected to the bottoms of both lower panels so that as both slides move up and down the retainer sides, the slides maintain both lower panel bottoms in adjacent relation to the retainer both as the lower panels fold up under the upper panels, and as the upper and lower panels unfold to cover the beam splitter; wherein the slot is rectangular and is sized to receive the retainer foot-first, but is too short to receive the slides at the sides of the retainer, so that as the retainer is pushed into the chamber through the slot, the slides rest on a surface adjacent the slot and move up the retainer sides, opening the doors.

13. The assembly of claim 12 including means for spring biasing the doors to their closed positions so that as the retainer is removed from the chamber, the slides move down the retainer sides so that the doors close to protect the beam splitter while the retainer is outside the chamber.

14. The assembly of claim 12 further including a dish which is mounted to the block exterior surface around the slot, the dish including a forward wall which projects upwardly and forwardly at an incline from the exterior surface; a back wall which projects upwardly and rearwardly at an incline from the exterior surface, the forward and back walls being parallel to a long axis of the slot; and two sidewalls which are parallel to a short axis of the slot and are joined to the forward and rearward walls and to the exterior surface; wherein when the retainer is inserted into the chamber and the holder doors open, the doors are contained and supported by the dish with the front door resting on the forward wall and the rear door resting on the back wall.

15. The assembly of claim 12 wherein the slides each have a downward facing notch, and the assembly further includes two catches which extend upwardly from the surface where the slides rest adjacent the slot, the notches being adapted to register with the catches to help position the holder while the retainer is being inserted into the chamber.

16. A beam splitter mounting assembly which enables an operator to easily and protectively place a beam splitter into a proper position within an interferometer, the assembly comprising:

(a) a mounting block having portions which form a chamber for receiving the beam splitter, the chamber extending up to a slot through an exterior surface of the block; and (b) a beam splitter holder for protectively holding a beam splitter, the holder being adapted to be placed within the chamber to position and mount the beam splitter correctly in the chamber, the holder including:

(1) a retainer which includes a crown, a foot, a front surface, and a rearsurface, and which has a hole therethrough from the front surface to the rear surface, the hole being sized to contain and hold the beam splitter;

(2) a front door and a rear door, each door including and being formed by an upper panel with a top and a bottom, the upper panel top being hingedly connected to the retainer crown to allow the upper panel to pivot outwardly and upwardly away from the retainer, and a lower panel with a top and a bottom, the lower panel top being hingedly connected to the upper panel bottom to enable the lower panel to fold up and under the upper panel as the upper panel pivots outwardly and upwardly when the door opens, wherein the doors are movable between a closed position in which the front door substantially covers the retainer front and the rear door substantially covers the retainer rear so that both doors cover and protect the beam splitter, and an open position in which the doors are pivoted upwardly with the upper and lower panels folded together to expose the beam splitter; and (3) two slides, each slide being positioned adjacent to a retainer side and being pivotally connected to the bottoms of both lower panels so that as both slides move up and down the retainer sides, the slides maintain both lower panel bottoms in adjacent relation to the retainer both as the lower panels fold up under the upper panels and as the upper and lower panels unfold to cover the beam splitter, wherein the slot is rectangular and is sized to receive the retainer foot-first, but is too short to receive the slides at the sides of the retainer, so that as the retainer is pushed into the chamber through the slot, the slides rest on a surface adjacent the slot and move up the retainer sides, opening the doors.

17. The assembly of claim 16 wherein the doors are spring-biased to their closed positions so that as the retainer is removed from the chamber, the slides move down the retainer sides so that the doors close to protect the beam splitter while outside the chamber.

18. The assembly of claim 16 further including a dish which is mounted to the block exterior surface around the slot, the dish including a forward wall which projects upwardly and forwardly at an incline from the exterior surface, a back wall which projects upwardly and rearwardly at an incline from the exterior surface, the forward and rearward walls being parallel to a long axis of the slot, and two sidewalls which are parallel to a short axis of the slot and are joined to the forward and rearward walls and to the exterior surface, wherein when the retainer is inserted into the chamber and the holder doors open, the doors are contained and supported by the dish with the front door resting on the forward wall and the rear door resting on the back wall.

19. The assembly of claim 16 wherein the slides each have a downward facing notch, and the assembly further includes two catches which extend upwardly from the surface where the slides rest adjacent the slot, the notches being adapted to register with the catches to help position the holder while the retainer is being inserted into the chamber.

20. A beam splitter holder compartment for protectively storing unused beam splitters within their beam splitter holders and for covering and protecting a slot into a chamber within an interferometer mounting block of a spectrometer into which a single beam splitter with its holder can be placed for use, the compartment comprising:
 (a) a base having an opening therethrough through which a beam splitter holder with beam splitter can be inserted within the slot into the chamber;
 (b) means on the base for receiving an unused beam splitter holder for storage, the base being mounted to the spectrometer over the mounting block so that the opening overlies the slot;
 (c) a lid which is connected hingedly to the base to be movable between an open position in which an operator has access to the unused beamed splitter holder and to a beam splitter holder inserted in the opening, and a closed position in which the lid covers the base; and
 (d) means for sealing the peripheral edge where the lid meets the base to prevent moisture from entering the compartment volume defined between the base and lid.

21. The compartment of claim 20 wherein the means on the base for receiving and unused beam splitter comprises at least one depression in the base surface, the depression conforming in shape to a face of a beam splitter holder so that a holder may be seated at least partially within the depression for storage.

22. The compartment of claim 21 wherein the lid includes a roof and sidewalls extending therefrom which are joined together to define the interior of the compartment, the sidewalls descending to terminate at peripheral edges of the lid; and
 wherein the compartment further includes:
 (a) a cushion which is placed against the roof within the compartment interior between the sidewalls to overlie and protect the beam splitter holders when the lid is closed; and
 (b) a plurality of pads, each pad lying within one of the depressions on the bottom thereof to cushion and protect the holder seated within the depression.

23. The compartment of claim 20 wherein the opening is defined by a margin which is adapted to circumscribingly overlie a dish which is mounted to an exterior surface of the block around the slot so that the operator has full access to the entire dish.

24. The compartment of claim 20 further including at least one latch which holds the lid in its closed position over the base until released.

25. The compartment of claim 20 further including an integral support member which descends from a side of the base to abut against an exterior of a spectrometer to position and brace the compartment on the spectrometer.

26. The compartment of claim 20 wherein the base has at least one vent which extends therethrough to allow dry purge air to pass between the interferometer and the compartment interior.

27. The compartment of claim 20 wherein the means for sealing the edge where the lid meets the base includes a groove formed about the periphery of the base circumscribing the interior of the compartment, and an elastic gasket which is seated in the groove and which extends slightly upwardly beyond the groove.

* * * * *

UNITED STATES PATENT AND TRADEMARK OFFICE
CERTIFICATE OF CORRECTION

PATENT NO. : 4,844,614

DATED : July 4, 1989

INVENTOR(S) : Henderson, et al.

It is certified that error appears in the above-identified patent and that said Letters Patent is hereby corrected as shown below:

On the title page:

Title line "SPLITTING" should be --SPLITTER--.

Abstract line 22 "solt" should be --slot--.

Column 4, line 2 "spectometer" should be --spectrometer--.

Column 5, line 27 "co-planer" should be --co-planar--.

Signed and Sealed this

Twenty-sixth Day of March, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,844,614

DATED : July 4, 1989

INVENTOR(S) : Henderson, et al

It is certified that error appears in the above-identified patent and that said Letters Patent is hereby corrected as shown below:

On the title page item [75] Inventors: should read as follows:
--Jeff R. Henderson, Michael Jablonski, Gregory E. Adams,
  Allen J. Zerbel, all of Madison, Wisconsin.--.

Signed and Sealed this

Thirtieth Day of June, 1992

Attest:

DOUGLAS B. COMER

*Attesting Officer*    *Acting Commissioner of Patents and Trademarks*